June 24, 1958  A. F. DERNBACH  2,840,172
SEALING MEANS
Filed Jan. 2, 1957
FIG. 1
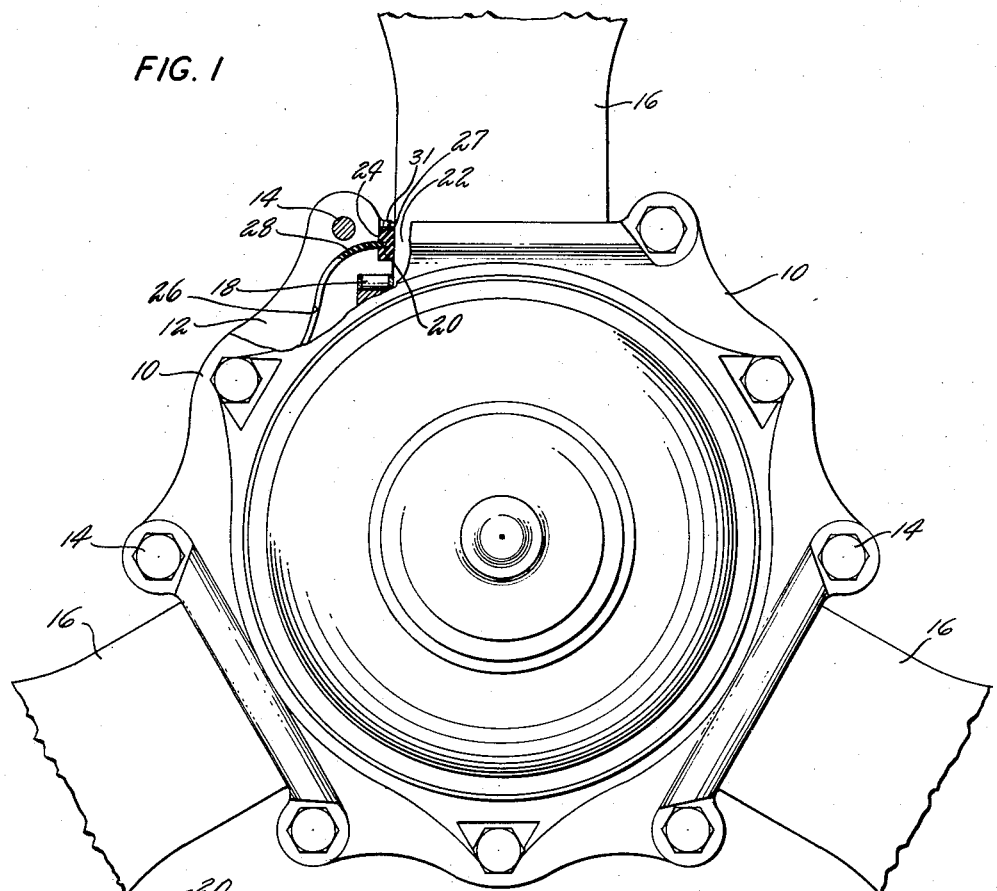
FIG. 2  FIG. 3  FIG. 6  FIG. 7
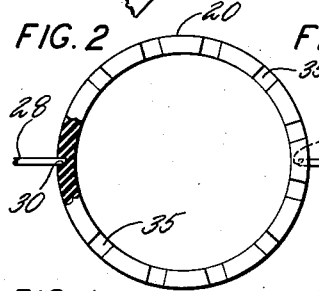 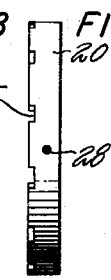 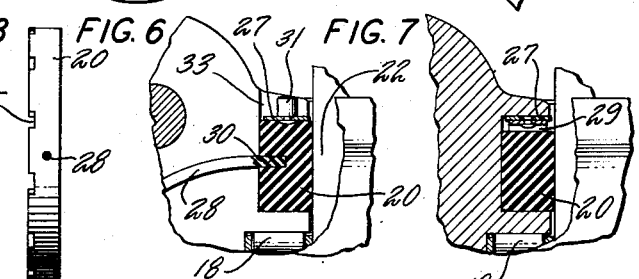
FIG. 4  FIG. 5  FIG. 8
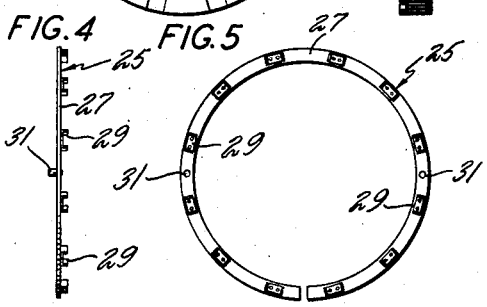
INVENTOR
ANTHONY FRANCIS DERNBACH
BY Harris G. Luther
ATTORNEY nited States Patent Office 2,840,172
Patented June 24, 1958

2,840,172

SEALING MEANS

Anthony F. Dernbach, West Hartford, Conn., assignor to United Aircraft Corporation, East Hartford, Conn., a corporation of Delaware Application January 2, 1957, Serial No. 632,222

5 Claims. (Cl. 170—160.23)

This invention relates to sealing means and particularly to means for sealing the halves of a propeller hub.

An object of this invention is sealing means which will seal the mating surfaces of the halves of a split propeller hub and also position the seal for, and seal the joint between, the split hub and the propeller blade supported in the hub.

Another object is to provide a satisfactory seal at the area where the blade seal crosses the hub split.

Further and other objects will be apparent from the following specification and the attached drawing in which:

Fig. 1 is an end view partly in section of a propeller hub supporting three propeller blades.

Fig. 2 is a plan view of a portion of the assembled sealing members.

Fig. 3 is a side view of Fig. 2.

Fig. 4 is a side view of the retaining ring.

Fig. 5 is a plan view of the retaining ring.

Fig. 6 is an enlarged portion of Fig. 1 showing the seal junction.

Fig. 7 is a sectional view similar to Fig. 6 but taken through one of the retaining ring channel members.

Fig. 8 is an enlarged side view of the assembled retaining ring and sealing ring.

In the operation of aeronautical propellers of the well known split hub type, difficulty has been experienced in keeping the hub joint tight adjacent the blade seal. The hub, which comprises the two parts 10 and 12 held together by a plurality of bolts 14, is apertured to receive propeller blades shown broken off at 16, each of which is retained in the hub in a well known manner and by well known means including a thrust bearing assembly, a portion of one of which is shown at 18. A blade seal 20 surrounds each blade shank 22 and is received in mating grooves 24 in hub halves 10 and 12, to provide a seal against the escape of oil from the interior of the hub. An anchoring ring 25 holds the seal 20 in the hub against turning with the blade 16. The hub is normally filled with oil under pressure to provide lubrication for the propeller blade pitch changing mechanism usually located in or attached to the hub and also to lubricate the thrust bearing assembly 18. The seal 20 may be an endless ring of any suitable material such as synthetic rubber which will form a suitable seal and may be stretched sufficiently to be slid into place over one end of the propeller blade, and then contract into sealing engagement.

Anchoring ring 25 comprises a split flat supporting ring 27 of a strong springy material such as tempered steel having metal channel members or keys 29 fastened to one side as by riveting and having keys in the form of dowel pins 31 projecting from the opposite side. Pins 31 are received in recesses 33 cut in the hub, preferably at the mating surfaces of the hub parts and channel members 29 are received in recesses 35 in the adjacent surface of the seal 20. The anchoring ring is thus keyed to the hub and in turn, acts as a key restraining the seal against rotation relative to the hub. Split ring 25 may be assembled over the blade by spreading the ring ends sufficiently to pass over the blade shank.

Mating grooves indicated at 26 are formed in each hub half. Each groove is a half-round trough and is adapted to receive a substantially round sealing strip 28 which may be of any suitable material such as rubber. Prior to the present invention, the grooves 26 have been stopped just short of the groove 24 so as to prevent the sealing strip 28 from interfering with the sealing action of seal 20 as by expanding when the halves are tightened together elongating the strip 28 and forcing seal 20 away from the bottom of recess 24 or otherwise interfering with the sealing action. This left a small unsealed area which could cause a leak.

Applicant has found that by making a hole in each seal 20 of the proper size and properly located to receive the sealing strip 28, provision can be made for any elongation of strip 28 caused by tightening the halves together to squeeze the strip 28 in the mating grooves 26 to provide the necessary hub joint seal and any interference with the sealing ability of the seal 20 avoided.

The hole, indicated at 30, in the seal 20 is made approximately the size of the strip 28 and is usually sufficiently larger to permit easy insertion of the strip 28 into the hole 30. Upon assembly of the hub and blades and the tightening of the hub halves, the hole is contracted sufficiently with the compression of the seal 20 to provide a fluid tight seal at the junction of the two seals 20 and 28 and still permit any necessary movement of the seal strip 28 without distorting seal 20.

Anchoring ring 25, by holding seal 20 against rotation relative to hub parts 10 and 12, prevents shearing of seal strip 28 where it enters seal 20 by rotation of seal 20.

Although the preferred embodiment has been shown and described herein, it will be apparent that various changes and modifications may be made in the construction and arrangement of the various parts without departing from the scope of this novel concept.

I claim:

1. Means for sealing a propeller hub having separable parts meeting at a parting surface and a blade shank whose longitudinal axis is parallel to said parting surface extending between the inside and the outside of said hub in an aperture in said parts through said parting surface comprising an elongated strip seal received in mating grooves in said parting surface, a sealing member received in grooves in the aperture surface in said parts and surrounding said blade shank, means restraining said sealing member against rotation with said blade relative to said hub and means defining an aperture in said sealing member receiving the end of said elongated seal.

2. Means for sealing two separable parts of a container having parting surfaces and a rotatable member passing through said parting surfaces comprising a seal encircling said rotatable member and seated in a groove in said parts and adapted to be compressed between said parts and said member upon forcing said parting surfaces toward each other to seal the joint between said member and said parts, a ring member in said groove between said seal and said container parts and having means coacting with said parts and said seal to prevent relative rotation of said parts and said seal, an elongated sealing strip seated in a groove in said parting surfaces and having an end portion located in sealing relation with said seal in an aperture through an outer surface of said seal, said sealing strip adapted to be compressed by forcing said parting surfaces toward each other to seal the joint between said parting surfaces and the joint between said seal and said sealing strip.

3. Means for sealing two separable parts of a container having parting surfaces and a rotatable member passing through said parting surfaces comprising a seal encircling said member and seated in a groove in said parts and adapted to be compressed between said parts and said member upon forcing said parting surfaces toward each other to seal the joint between said member and said parts, means preventing relative rotation of said container parts and said seal, an elongated sealing strip seated in a groove in said parting surfaces and having an end portion positioned in a hole extending part way through said seal in sealing relation with said seal.

4. In combination with an aeronautical propeller having a plurality of radially extending pitch adjustable blades and a split hub having two parts with juxtaposed parting surfaces in the plane of the longitudinal axes of said blades and with the blade shanks extending between the inside and the outside of said hub, an endless seal surrounding each blade and received in a recess in the hub parts, a strip seal received in juxtaposed recesses in the parting surfaces of said hub parts, and extending from one endless seal to an adjacent endless seal, said endless seals being apertured to receive and completely surround the adjacent end portion of said strip seal to form a fluid tight joint between said strip and endless seals and means connecting said endless seals with said hub to prevent rotation of said seals relative to said hub.

5. In combination with an aeronautical propeller having a plurality of radially extending adjustable pitch blades and a split hub having two parts with juxtaposed parting surfaces in the plane of the longitudinal axes of said blades and with the blade shanks extending between the inside and the outside of said hub sealing means for the joint between parting surfaces, an endless seal surrounding each blade and received in a recess in the hub parts, a split ring located in said recess between said seal and said hub, projections on said ring extending into said hub and said seal to key said seal to said hub, a strip seal received in juxtaposed recesses in the parting surfaces of said hub parts, and extending from one endless seal to an adjacent endless seal, the end of said strip seal being dimensioned to be readily received in a hole extending part way through the adjacent endless seal and spaced from the bottom of said hole, said seals being compressed into sealing relation by forcing said parting surfaces together.

References Cited in the file of this patent

UNITED STATES PATENTS

| | | |
|---|---|---|
| 1,912,408 | Schelhammer | June 6, 1933 |
| 2,369,538 | d'Aubarede | Feb. 13, 1945 |
| 2,436,612 | Sheets | Feb. 24, 1948 |
| 2,471,895 | Radtke | May 31, 1949 |

FOREIGN PATENTS

| | | |
|---|---|---|
| 437,624 | France | Apr. 25, 1912 |